(12) United States Patent
Noel et al.

(10) Patent No.: US 11,717,780 B2
(45) Date of Patent: Aug. 8, 2023

(54) COLLAPSIBLE DISPOSABLE FILTER

(71) Applicants: Bill Noel, Fisherville, KY (US);
Stephen Wallace, Henryville, IN (US);
Brian Morris, Mount Washington, KY (US)

(72) Inventors: Bill Noel, Fisherville, KY (US);
Stephen Wallace, Henryville, IN (US);
Brian Morris, Mount Washington, KY (US)

( * ) Notice: Subject to any disclaimer, the term of this patent is extended or adjusted under 35 U.S.C. 154(b) by 190 days.

(21) Appl. No.: 17/063,686

(22) Filed: Oct. 5, 2020

(65) Prior Publication Data
US 2021/0101103 A1 Apr. 8, 2021

Related U.S. Application Data

(60) Provisional application No. 62/973,399, filed on Oct. 3, 2019.

(51) Int. Cl.
*B01D 46/00* (2022.01)
*B01D 46/52* (2006.01)

(52) U.S. Cl.
CPC ..... *B01D 46/0016* (2013.01); *B01D 46/0015* (2013.01); *B01D 46/521* (2013.01); *B01D 2275/203* (2013.01); *B01D 2279/50* (2013.01)

(58) Field of Classification Search
CPC ............ B01D 46/0002; B01D 46/0015; B01D 46/0016; B01D 46/521; B01D 2275/203; B01D 2279/50
USPC ........... 55/493, 496, 497, 501, 521, DIG. 31
See application file for complete search history.

(56) References Cited

U.S. PATENT DOCUMENTS

| | | | |
|---|---|---|---|
| 3,594,989 A * | 7/1971 | Bastiaans | B03C 3/45 428/116 |
| 4,570,844 A * | 2/1986 | Wysocki | B65D 5/2009 55/DIG. 31 |
| 5,252,111 A * | 10/1993 | Spencer | B01D 46/2486 55/496 |
| 6,328,778 B1 * | 12/2001 | Richerson | B01D 46/0002 55/482 |
| 7,258,717 B2 | 8/2007 | Duffy | |
| 7,758,667 B2 | 7/2010 | Ashwood et al. | |
| 9,320,998 B2 * | 4/2016 | Gillilan | B01D 46/10 |
| 10,213,721 B2 | 2/2019 | Elliott | |
| 10,245,542 B2 | 4/2019 | Knuckles | |
| 10,286,351 B2 * | 5/2019 | Schuld | B01D 46/4227 |
| 2004/0148915 A1 | 8/2004 | Lipner | |
| 2007/0204574 A1 * | 9/2007 | Workman | B01D 46/0016 55/495 |
| 2007/0204576 A1 * | 9/2007 | Terlson | B01D 46/10 55/496 |
| 2008/0034718 A1 | 2/2008 | Schuld et al. | |

(Continued)

*Primary Examiner* — Minh Chau T Pham
(74) *Attorney, Agent, or Firm* — Carrithers Law Office, PLLC; David W. Carrithers (57) ABSTRACT

The addition of a medial longitudinal score line (hinge point) along the longitudinal channels of the filter frame allows for thinner media and/or collapsing the frame on itself which will reduce scrap, save space and save tremendously on shipping costs. The additional score line can be a cut score, skip score, crush score or liquid line. The collapsed filter frame expands upon sliding into the channels of the filter frame media holder whereby the filter frame expands and widens to fit the filter assembly.

4 Claims, 4 Drawing Sheets

(56) References Cited

U.S. PATENT DOCUMENTS

| | | | |
|---|---|---|---|
| 2008/0066436 A1* | 3/2008 | Magee | B01D 46/0002 55/497 |
| 2008/0148698 A1* | 6/2008 | Nowak | B01D 46/0016 55/493 |
| 2009/0019824 A1 | 1/2009 | Lawrence | |
| 2009/0077937 A1* | 3/2009 | Privitt | B01D 46/0002 55/493 |
| 2013/0133301 A1* | 5/2013 | Sproule | B01D 46/521 55/501 |
| 2015/0107204 A1 | 4/2015 | Anoszko et al. | |
| 2015/0265957 A1 | 9/2015 | Fox | |
| 2015/0267927 A1 | 9/2015 | Zhang et al. | |
| 2018/0193783 A1 | 7/2018 | Baldinger | |
| 2020/0001220 A1 | 1/2020 | Barry et al. | |
| 2020/0047101 A1 | 2/2020 | Katare et al. | |

\* cited by examiner

COLLAPSIBLE DISPOSABLE FILTER

CROSS REFERENCES TO RELATED APPLICATIONS

This application claims priority from U.S. Provisional Application Ser. No. 62/973,399 filed on Oct. 3, 2019 and is incorporated by reference in their entirety.

TECHNICAL FIELD

The present invention relates to the disposable HVAC air filter frames.

BACKGROUND OF THE INVENTION

Disposable air filters are commonly used in forced air systems (e.g., residential heating and air-conditioning systems often referred to as "HVAC" systems) to remove particulate matter (e.g., dust and dirt particles). Air filters typically include a filter media surrounded and supported by a frame.

Pleated disposable air filters are used for capturing dust, particulate matter, and other airborne materials. The pleated filters media is typically held in a rectangular or square paper or plastic channel whereby the disposable air filter unit is disposed in a frame integral with an air intake conduit of a blower unit for a HVAC unit or other air circulation device. The filter media held within the paper or plastic frame just slides into a slot between the air duct and blower. Periodic or occasional replacement of a filter and frame assembly is required to maintain clean air.

The filter and frames are designed to be disposable since they become dirty and clogged in a relatively short time and are not easily cleanable. The filter elements or media are generally planar fibrous air filter element fixed in a paperboard frame which supports the air filter element. Additional supporting and/or reinforcing components, such as a mesh screen and/or adhesive beads, may also be included. After a period of use, the filter media becomes dirty or clogged, and must be replaced.

The filter framed supports the filter media and defines a perimeter size and shape of the air filter. It is normally selected to match the size and shape of the expected end-use application. Typically residential HVAC systems are configured for use with a "standard" sized air filter of 20 inch×20 inch×1" or width and length dimensions typically with a thickness of one inch. These frames are typically made from chipboard but could also be made from recycled board, plastic, urethanes, or other like materials. The conventional plastic of paper cardboard frame occupy a relative large volume of space on transportation vehicles, on retailer shelves, and in end user's homes. Thus, a disadvantage of such disposable air filters, is that their relative bulkiness increases the shipping costs and large numbers of filters require significant storage space. The filter element and frame being integrally connected together are discarded as a unit.

SUMMARY OF THE INVENTION

The present invention is paper filter frame which has a scored center allowing a center crease for folding the filter and decreasing the width during shipping and storage. Packaging and shipping can be accomplished by a simple modification to the existing strip stock or die-cut stock designs. The addition of a new score line (hinge point) allows for thinner media and/or collapsing the frame on itself which will reduce scrap, save space and save tremendously on shipping costs. The additional score line can be a cut score, skip score, crush score or liquid line. These frames are typically made from chipboard but could also be made from recycled board, plastic, urethanes, or other like materials.

Companies have struggled with a way to reduce waste in the air filter industry due to thin or off spec media. This disposable collapsible frame of the present invention allows for the use of thinner media. Storage space for finished goods take up a lot of real estate for both manufacturers and end users. The present invention is intended to be used in HVAC and like applications with the advantage of using thinner filter media as well as having the ability to be collapsed resulting in less storage space as well as smaller packages for filters resulting in lower shipping costs.

The present invention makes manufacturing, storage and shipping of disposable filters more cost effective for both the manufacturer and retailer. This process can be adapted to any filter thickness from ½" to 6" and possibly further. So long as the disposable collapsible filter frame fits the track or channels for holding the filter between the air duct and blower unit, the compression of the longitudinal score along the filter sidewall will expand the filter frame thickness and decrease its width and length in order to fit within the dimensions of the filter track expanding the filter frame so it will not collapse and maintain its structural integrity.

Prior art references include U.S. Publication 20140267927 teaching a collapsible air filter assembly including a score line along the longitudinal axis of the end members of the filter frame; however, the score line is folded upward to form a "L-shaped" cross section. The end members are pliable to conform and fit to the ends of filter pleats and is held in a rigid condition by rigid side members. U.S. Publication 20150265957 teaches a collapsible air filter assembly including a score line along the longitudinal axis of the longitudinal members permitting one side of the longitudinal frame member to be folded upward forming a "L-shaped" cross section for nesting a filter element therein. U.S. Publication 20040148915 teaches a foldable filter frame wherein the longitudinal members include scores whereby the members can be folded over forming a double wall frame. U.S. Patent Publication 20200001220 teaches a variable air filter assembly wherein the frame members include a longitudinal score whereby the sides can be folded forming an L-shaped member which are affixed to corner brackets. all of the prior art embodiments typically form an L-shaped frame folding the member along the score lines at a 90 degree angle and connecting the members at the corners. None of these prior art references teach Applicant's novel design having three parallel longitudinal score lines spaced apart wherein the outer score lines are folded 90 degrees and the center score line is collapsed by folding over for shipping or storage and expanded forming a flat channel containing the filter media therein for insertion into a air conduit filter frame.

One preferred embodiment comprises a frame having first and second end frame members and first and second side frame members. The filter media extends between and is attached to the first and second end frame members or the first and second side frame members but not attached to the other of the first and second end frame members or the first and second side frame members. The frame is a one-piece frame at least a portion of which is attached to the filter media. The filter assembly is capable of forming a complete four sided frame but may include more than one piece as long as all pieces of the frame are connected and/or form a single system. In some embodiments, the filter media includes pleats.

A second embodiment comprises a frame having first and second end frame members and first and second side frame members. The filter media extends between and is attached to the first and second end frame members and the first and second side frame members. The frame is a one-piece frame at least a portion of which is attached to the filter media. The filter assembly is capable of forming a complete 4-sided frame but may include more than 1 piece as long as all pieces of the frame are connected and/or form a single system. In some embodiments, the filter media includes pleats.

Some embodiments relate to an HVAC air filter comprising a pleated filter medium assembly defining pleats, opposing sides and opposing ends; first and second end frame members assembled to a corresponding one of the opposing ends; and first and second side frame members selectively coupled to the end frame members and over a respective one of the opposing sides. A distance between the end members define a length of the air filter. The air filter is configured to provide a filter frame in a collapsed state in which the frame sidewall collapses outward to compress the filter media to a selected thickness. The pleated filter medium assembly can be compacted and expanded to a state in which the pleats are stretched to a operational state. The thickness in the collapsed state is less than the length in the expanded state and the side frame members are transitionable to an arrangement that retains the air filter in the expanded state.

It is an object of the present invention to provide an air filter of a type in which a filter element is retained within a collapsible holder frame and easily folded up into a compact state when not in service, such as when being shipped or stored, but easily expanded after being installed in a frame to be placed in service.

It is another object of the present invention to provide a sealing engagement between the expanded filter element and the expanded frame which minimizes the volume of air flow around the air filter element.

It is another object of the present invention to utilize an air filter element comprised of a fibrous sheet material formed in a pleated configuration which is expandable from a flattened collapsed state by expanding the filter frame and stretching the pleats apart increasing the thickness of the filter frame.

It is another object of the present invention to provide an optional grid, grid, netting, or porous restraint panel installed on at least one selected side of the filter media extending from the top and bottom sides and ends of the filter frame for providing a restraint against excessive bulging of the expanded filter element when air is flowing therethrough.

It is another object to include at least one longitudinal strip with each filter and frame unit to insert between the track and the filter frame to adjust the fit and provide requisite pressure on the outer edges of the filter frame to aid in expansion of the thickness of the filter.

It is another object of the present invention to store and ship the filter frame and pleat assembly as integral assembly in the collapsed configuration not requiring assembly from the user.

It is another object of the present invention to utilize a thinner paper thickness for the filter frame than conventional paper filter frames.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

In accordance with FIGS. 1-9, there is provided a disposable collapsible pleated air filter frame.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. References to "front," "back," "rear," "upper," "lower," "right," and "left" are used to identify the various elements to a user facing the sink, and with "lateral" being left-right.

It should further be noted that for purposes of this disclosure, the term coupled means the joining of two members directly or indirectly to one another. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

As used herein, the term "about" can be reasonably appreciated by a person skilled in the art to denote somewhat above or somewhat below the stated numerical value, to within a range of ±10%.

The degree of size variability of the frames, filter media, and other components may vary according to the particular application.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention is a disposable and collapsible HVAC air filter having a filter frame comprises a longitudinal strip of material having corners formed at 90 degrees angles bent inwardly having adjoining distal ends forming a rectangle. The filter frame longitudinal strip of material includes a first longitudinal end frame member and a second longitudinal end frame member connecting to an opposing first longitudinal side frame member and a second longitudinal side frame member. The first longitudinal end frame member includes three longitudinal spaced apart parallel score lines defining a first a first longitudinal side flange, a first longitudinal score line forming a first longitudinal side edge, a longitudinal center flange extending from the first longitudinal side edge including a longitudinal center score line, and a second longitudinal score line forming a second longitudinal side edge connecting a second longitudinal flange to the longitudinal center flange. The second longitudinal end member opposes the first longitudinal end frame member and includes three longitudinal spaced apart parallel score lines defining a first a first longitudinal side flange, a first longitudinal score line forming a first longitudinal side edge, a longitudinal center flange extending from the first longitudinal side edge including a longitudinal center score line, and a second longitudinal score line forming a second longitudinal side edge connecting a second longitudinal flange to the longitudinal center flange. The first longitudinal side member opposes the first longitudinal end frame member and includes three longitudinal spaced apart parallel score lines defining a first a first longitudinal side flange, a first longitudinal score line forming a first longitudinal side edge, a longitudinal center flange extending from the first longitudinal side edge including a longitudinal center score line, a second longitudinal score line forming a second longitudinal side edge connecting a second longitudinal flange to the longitudinal center flange whereby the first longitudinal side member connects the first longitudinal end member and the second longitudinal end member. The second longitudinal side member opposes the first longitudinal side frame member and includes three longitudinal spaced apart parallel score lines defining a first longitudinal side flange, a first longitudinal score line forming a first longitudinal side edge, a longitudinal center flange extending from the first longitudinal side edge including a longitudinal center score line, and a second longitudinal score line forming a second longitudinal side edge connecting a second longitudinal flange to the longitudinal center flange, whereby the second longitudinal side member connecting the first longitudinal end member and the second longitudinal end member. The first longitudinal side edge and the second longitudinal side edge remain at an obtuse angle and the longitudinal center flange is bent at an acute angle along the longitudinal center score line when the filter frame longitudinal strip of material is in a collapsed state storage state. The first longitudinal side edge and the second longitudinal side edge expand to form an inward directed 90 degree angle and the longitudinal center flange is expanded to form an obtuse angle of up to 180 degrees along the longitudinal center score line when the filter frame longitudinal strip of material is expanded to an open filter in use state.

In accordance with the present invention various embodiments of filter assemblies and their components including, for example, frames, filter elements supported along their outer edges by frames, and the filter frames may include grates or grids that span the areas between frame elements to further support the filter media. The filter media filter air passed therethrough. The filter media is porous and may be layered and optionally include woven and non-woven materials such as fabrics, piles, felts, and foams. The filter media may include materials that are spun bonded or molded. The filter media may include materials having antimicrobial properties. Other filter media materials and properties are within the scope of these descriptions.

More particularly, more than one the filter pad element may comprise a loosely woven fibrous material composed of natural and/or a synthetic fiber or combination thereof approximately one inch thick. A filter assembly may use a filter pad element comprising an electrostatic filter (filter having an electrostatic charge associated therewith) in combination with the primary filter to remove very small particles of dust and pollen. An electrostatic filter pad may comprise a layer of porous foam of about ¼ inches in thickness sandwiched between two pieces of electrostatic weave or mesh, such as AIR MEDIC PLUS. providing an antimicrobial system with 94% arrestance, and is held together in the filter frame. A charcoal filter may be employed as third stage or tertiary filter held within mesh container or other holding means in a frame to remove odors associated with the filtered waste products. Of course, it is contemplated that additional filters of various types and configurations may be utilized depending upon the filtration required for a particular application or environment desired. Finally, a wetting agent or liquid adhesive spray such as the water soluble spray, FILTER PLUS, produced by Air-Kontrol, Inc., Batesville, Miss., may be applied to the primary filter 80 to improve the performance and efficiency thereof and help to trap particles. So long as the filter media is compressible, almost any type of material can be utilized with the disposable collapsible filter frame of the present invention. All of the aforementioned filter pad elements may be incorporated within the disposable collapsible filter frame of the present invention.

Figure 1:
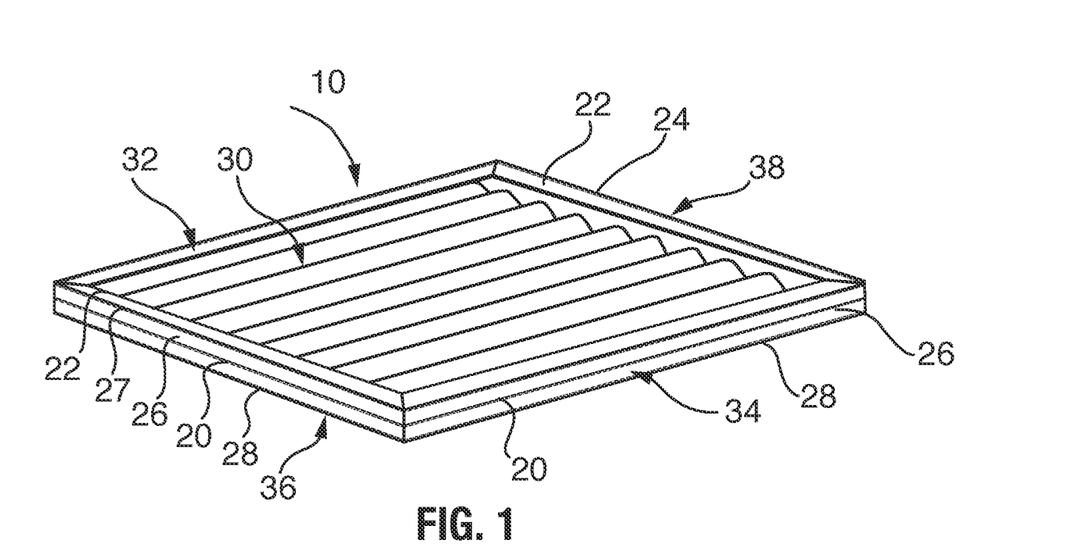
FIG. 1 is perspective view of a pleated filter media disposed within an expanded filter frame showing the longitudinal score line along the side and end edges of the frame creating an additional score line (hinge point) in the middle of the strips.
Figure 2:
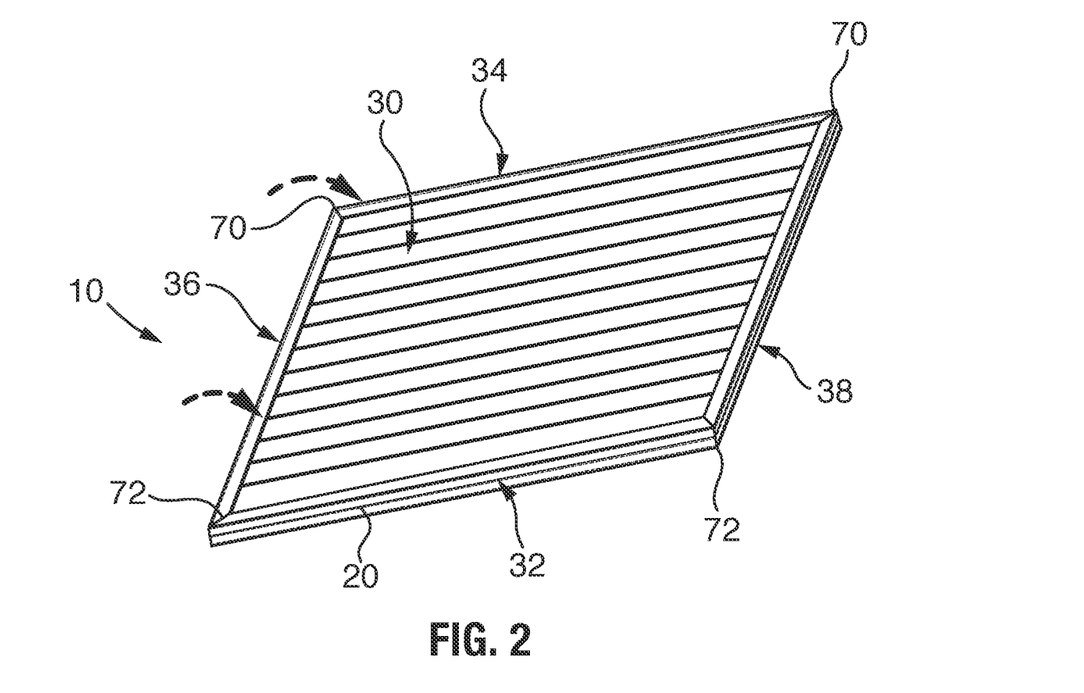
FIG. 2 is a top perspective view of the filter frame with pleated filter media showing a typically erected die-cut frame with the addition of the extra score line (hinge point) in the middle of the side walls.
Figure 3:
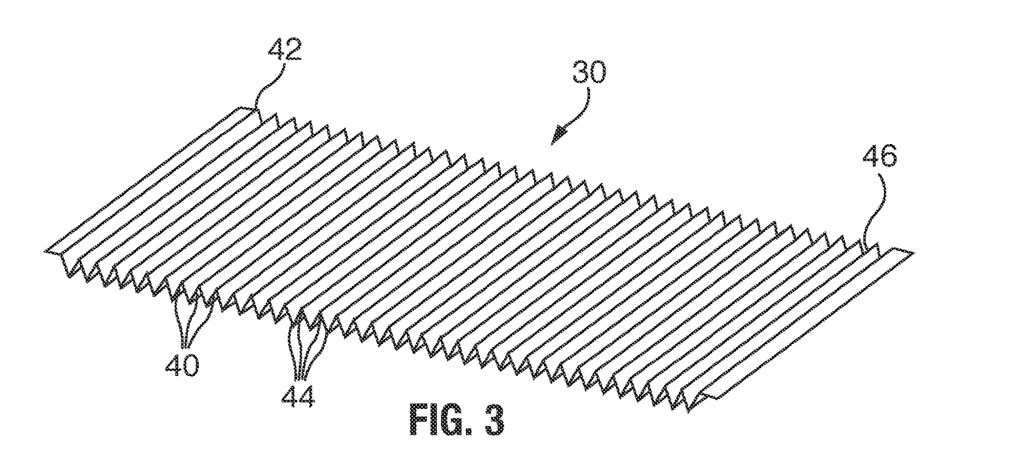
FIG. 3 is a perspective view showing pleated filter media.
Figure 4:
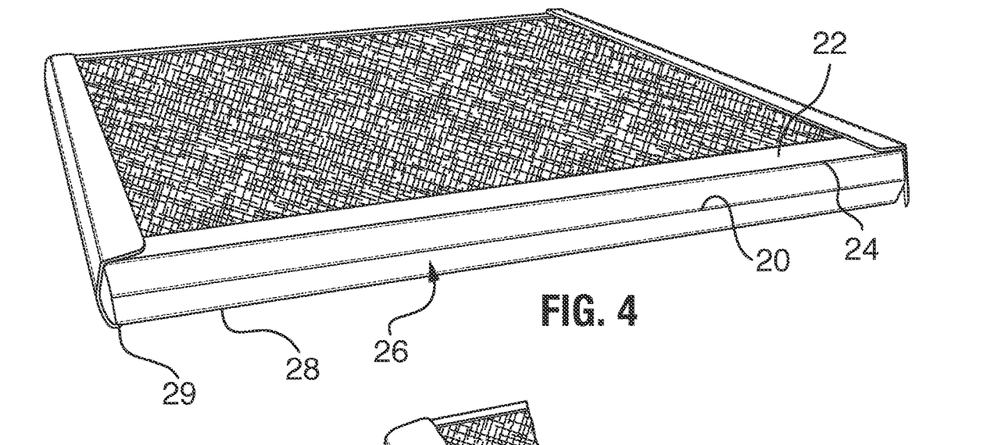
FIG. 4 is a perspective view of the expanded filter frame showing creases along the score lines extending along the center of the longitudinal members.
Figure 5:
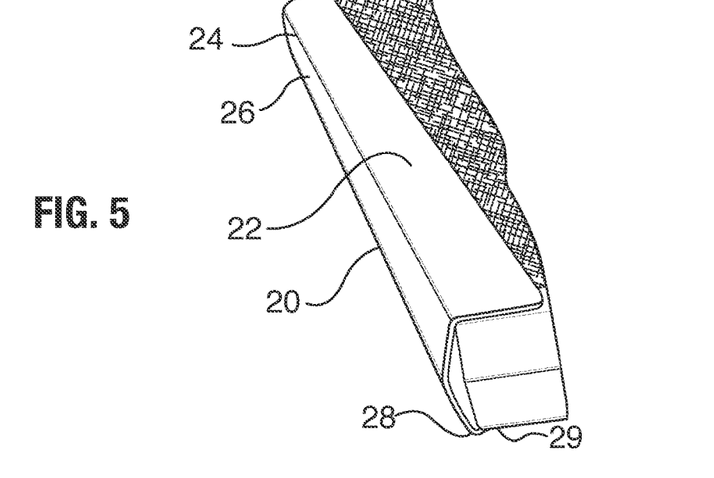
FIG. 5 is an enlarged view of die-cut filter frame shown in FIG. 4 in the semi-collapsed state showing the score line along the open flap.
Figure 6:
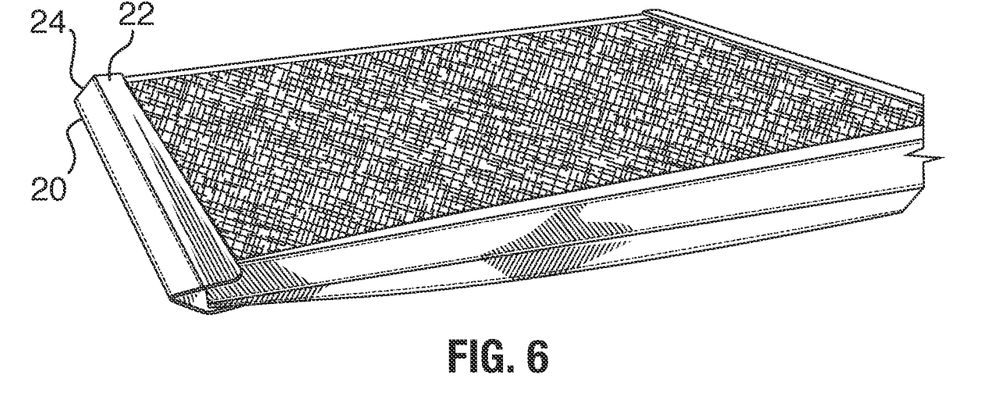
FIG. 6 is a perspective view showing a corner of the collapsible filter depressed whereby the center portion of the longitudinal member is expanded and extending outward and showing the filter in a semi-collapsed state to allow for easier manufacturing and shipping.
Figure 7:
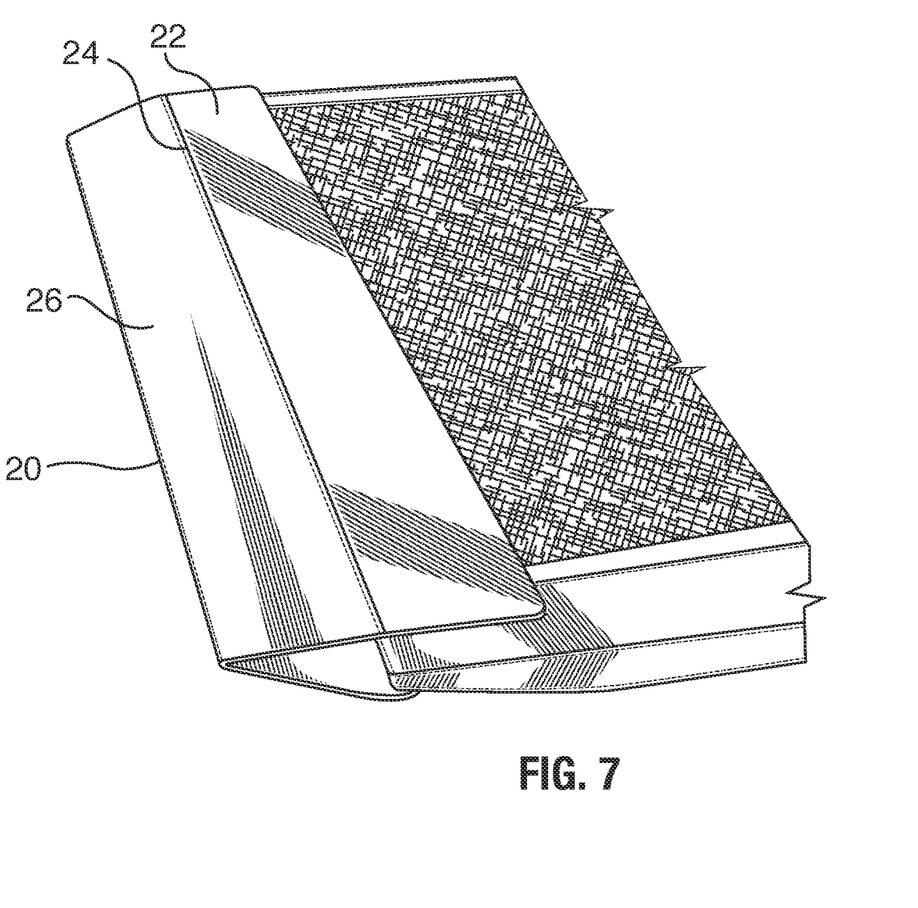
FIG. 7 is an enlarged view of the filter frame of FIG. 6 showing the collapsed filter frame wherein the periphery of the filter frame is enlarged and the thickness of the filter frame decreases with collapsing the frame.
Figure 8:
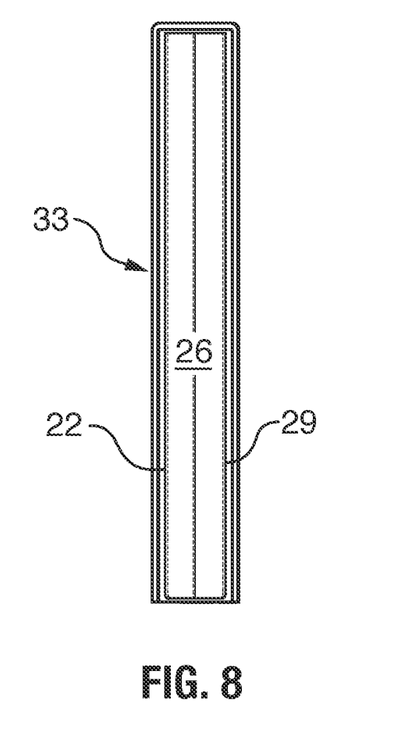
FIG. 8 is an end view of the track or channels of an HVAC housing forming a slot for slidable cooperative engagement with a filter frame with the edges of the filter frame compressed and thickness increased.
Figure 9:
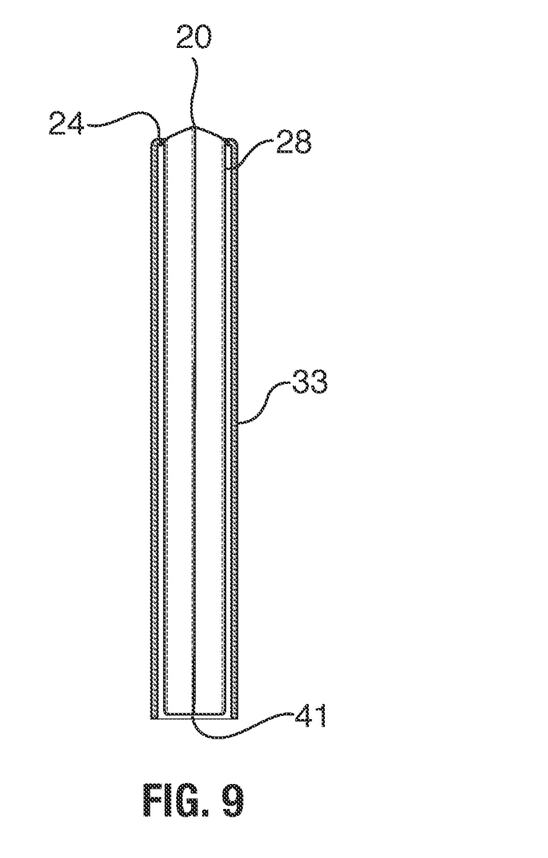
FIG. 9 is an end view of the HVAC housing showing a partially collapsed filter frame therein wherein the flattened filter frame bottom is thicker adjacent the bottom of the slot and the top portion of the expanded filter frame is less thick but may be compressed downward to fit in the slot.

The disposable collapsible filter frame of the present invention is insertable within an slotted opening 33 for a filter frame formed within a housing of a conventional HVAC unit assembly as shown in FIGS. 8 and 9. FIG. 9 shows a filter frame having an expanded end disposed within the slot and a collapsed end having narrower side walls and an extended end projecting pass the opening. The opening of the housing is in fluid communication with and cooperative engagement with an air duct wherein the housing includes a top and a bottom track connected by an end track. The tracks comprises spaced apart side flanges extending inwardly toward one another from the inner wall of the housing or air conduit forming a channel for cooperative sealable engagement with an outer surface of an air filter frame or a filter cartridge containing one or more filter frames containing filter media. The filter frames are inserted into the track normal to the flow of air through the air conduit into the housing of the HVAC unit.

It is contemplated that a filter cartridge or filter frame is fabricated from metal or plastic strips connected together at their ends or a single strip wrapped around the peripheral edges of the filter pad(s). The outer edges of the strips are bent inwardly at about a ninety degree angle around the filter pad(s) to hold the pad(s) into position. The outer edge at each corner can be cut or overlap and affixed to one another by an adhesive to form the corners.

The flanges of the track overlaps the side edges of the air filter frame forming an air tight seal thereby. The flanges of the track are in slidable communication with a portion of the top channel, bottom channel and end channel of the filter frame providing a friction fit for holding the filter frame and media (such as a pleated filter) in position within the housing.

The air filter frame of the present invention incorporates a replaceable pleated air filter element which is installed in a rectangular frame. The air filter element is collapsible by flattening together the pleats and placed in an opening in the frame and thereafter stretched apart to extend across the space opposite frame sides and held in that position, The air filter frame 10 is generally configured to be expandable by a user from a collapsed, initial state to an expanded, end-use state, and to self-retain the expanded state for installation and use within an HVAC system. The air filter 10 includes a pleated filter media assembly 30, opposing first and second end frame members 32, 34, first and second side frame member 36, 38, and a die-cut longitudinal score line 20 along the center of each longitudinal end frame member 32 and 34, and each of the longitudinal side frame members 36 and 38. Each longitudinal end member 32 and 34 and each longitudinal side member 36 and 38 are formed of longitudinal strips folded longitudinally and (scored or creased or die-cut) to form a first longitudinal flange 22, a first longitudinal scored and/or creased side edge 24, a second longitudinal scored and/or ceased side edge 28, and second longitudinal flange 29 and a center flange 26 including the longitudinal center score line 20 disposed between and joining the first longitudinal side flange 22 and second longitudinal side flange 29.

The pleated filter media assembly 30 is configured to readily transition between the collapsed and expanded states by compressing the filter media and frame assembly. Upon transitioning the pleated filter media assembly 30 to a desired thickness having slightly width and length dimensions in the expanded state. The end frame members 32, 34 and the side frame member 36, 38 are pushed inward expanding the frame and pleated filter media assembly 30 to a selected expanded state.

A removable wrapper or other packaging can be provided to retain the air filter 10 in the collapsed state (with the air filter 10 and the packaging combining to define a packaged air filter for retail sale). The packaging can be removed to permit transitioning of the air filter 10 to the expanded state. The air filter 10 does not require a conventional, rigid frame permanently surrounding the pleated filter media assembly 30, and can be provided in the collapsed state to save space with shipping and display.

"Pleated" is defined as a web at least a portion of which has been folded to form a configuration comprising rows of generally parallel, oppositely oriented folds. As shown in the figures, the pleated filter media assembly 30 includes a plurality of pleats 40 each including a fold line 42 defining a pleat tip 44 and a pair of adjacent panels 46. Materials and construction of the pleated filter media assembly 30 are such that the pleated filter media assembly 30 can be repeatedly transitioned between an expanded condition and a collapsed condition, with a spacing distance between successive pleat tips 44 in the expanded condition being greater than that of the collapsed condition. The "expanded condition" of the pleated filter media assembly 30 corresponds with the "expanded state" of the air filter 10, and the "collapsed condition" of the pleated filter media assembly 30 corresponds with the "collapsed state" of the pleated air filter 10.

The air filter 10 does not need additional components to retain the pleated filter media assembly 30 in the particular size and shape of the expanded state. The pleated filter media assembly 30 can be transitioned (e.g., expanded or collapsed) to an "expanded condition" and "collapsed condition". The air filter 10, however, as whole can self-retain the shape of the selected expanded state and collapsed state.

The pleated filter media assembly 30 can consist of a pleated filter media or web or can include one or more additional components or structures applied or assembled to a pleated filter media so long as the resultant pleated filter media assembly 30 can at least be transitioned from the collapsed condition to the expanded condition without damaging a structural integrity of the pleated filter media assembly 30, and optionally can be repeatedly transitioned between the collapsed and expanded conditions without damaging a structural integrity of the pleated filter media assembly 30. The pleated filter media 30 can be self-supporting or non-self-supporting.

Where the pleated filter media assembly 30 consists of the pleated filter media alone, the pleated filter media or web can be self-supporting or non-self-supporting. A "self-supporting pleated filter media or web" can describe a pleated filter media or web that is deformation resistant without requiring stiffening layers, adhesive or other reinforcement in the filter media web.

The pleated filter media generally maintains its shape when subjected to an airstream. The pleated filter media or web can be "self-supporting". Moreover, the pleats have sufficient stiffness so that they do not collapse or bow excessively when subjected to the air pressure typically encountered in force air ventilation systems.

The particular filter media 30 selected for the pleated filter media assembly is not critical to the present disclosure so long as the resultant pleated filter media assembly 30 (whether consisting solely of the pleated filter media 30 alone or with additional structures applied thereto) has the desired characteristics described herein. The filter media 30 can be constructed, for example, from nonwoven fibrous media formed of thermoplastics or thermosetting materials such as polypropylene, linear polyethylene and polyvinyl chloride. Other suitable, non-limiting materials for the filter media include porous foams, nonwovens, papers, fiberglass, or the like. The pleated filter media assembly 30 can optionally include a highly open wire mesh or screen, one or more adhesive strands, etc., bonded to the filter media 30 in order to enhance the pleatability thereof and that is pleated along with the filter media 30 itself.

Pleats can be formed in the filter media 30 or in the pleated filter media assembly using various methods and components as are well known in the art, e.g., to form a pleated filter for use in applications such as air filtration, for example those described in U.S. Pat. No. 6,740,137 to Kubokawa et al. and U.S. Pat. No. 7,622,063 to Sundet et al., the entire teachings of both of which are incorporated herein by reference.

The end frame members 32, 34 are constructed of a material commonly used for HVAC filter frames, such as paper, paperboard, plastic. A lighter weight and less expensive frame material can be used with the collapsible filter frame than with conventional non-collapsing material. The end frame members 32, 34 can each have a length that substantially corresponds with a dimension of the corresponding pleated filter assembly end. While each of the end frame members 32, 34 may encompass a small portion of each of the opposing sides of the pleated filter media assembly 30, presence of the end frame members 32, 34 does not overtly restrict collapsing of the pleated filter media assembly 30. The pleated filter media assembly 30 can be condensed into a compact format in the collapsed state (e.g., at least a majority of the pleats 40 of the pleated filter media assembly 30 are free of the end frame members 32, 34. The end frame members 32, 34 can be attached to the pleated filter media assembly 30 in various manners as known in the art and appropriate for the materials employed. For example, in some embodiments, the end frame members 32, 34 are adhesively bonded over a corresponding one of the ends of the pleated filter media assembly 30.

Each of the side frame member 36, 38 defines opposing, leading and trailing ends 70, 72 with the trailing end 72 optionally being permanently connected to a corresponding one of the end frame members 32, 34. For example, the first side frame member 36 is attached to the first end frame member 32 proximate a corner defined by the first end 48a and the first side 50a, whereas the second side frame member 38 is attached to the second end frame member 34 proximate a corner defined by the second end 48b and the second side 50b. The length of each of the side frame members 36, 38 can be less than, equal to or greater than the length of each of the end frame members 32, 34.

When the user is ready to install the air filter 20 to an HVAC system, the user simply compresses the two end frame members 32, 34 and side members to expand the pleated filter media assembly 30 to a desired size corresponding with the filter receiving housing or bay of the HVAC system. Once the frame members 36, 38 are secured in the expanded state, the air filter 20 can be inserted into the tracks of the housing of the HVAC system and will perform to filter contaminants from the HVAC system's airflow. The side frame members 36, 38 maintain their strength in the expanded state to ensure the integrity of the air filter 20, combining with the end frame members 32, 34 to collective define a frame that secures the pleated filter media assembly 30.

This new type of manufacturing, packaging and shipping can be accomplished by a simple modification to the existing strip stock or die-cut stock designs. The addition of a new score line (hinge point) allows for thinner media and/or collapsing the frame on itself which will reduce scrap, save space and save tremendously on shipping costs. The additional score line can be a cut score, skip score, crush score or liquid line.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

We claim:

1. A disposable and collapsible HVAC air filter frame and filter unit consisting of:
   a filter frame including a first longitudinal end frame member and a second longitudinal end frame member connecting to an opposing first longitudinal end frame member and a second longitudinal side frame member;
   a longitudinal center score line extending the length of said first longitudinal end frame member, said second longitudinal end frame member, said first longitudinal side frame member, and said second longitudinal side frame member, each one having a square end without interlocking tabs; and a pleated filter media disposed within said filter frame; wherein said air filter frame and said pleated filter media providing a collapsed state in which said pleated filter media and said filter frame are in a compressed state wherein said longitudinal center score line of said first longitudinal end frame member and said opposing second longitudinal end frame member and said first longitudinal side frame member and said opposing second longitudinal side frame member is extendable outwardly forming an outward fold having an angle of less than 180 degrees when said air filter frame and said pleated filter media is in a compressed state and is expandable to rigid state upon application of inward pressure to said outward fold formed in said longitudinal center score line of said first longitudinal end frame member and said opposing second longitudinal end frame member and said first longitudinal side frame member and said opposing second longitudinal side frame member in which said filter frame and said pleated filter media are expanded to an in-use state.

2. A disposable and collapsible HVAC air filter frame and filter unit consisting of:

a filter frame comprising a longitudinal strip of material having corners formed at 90 degrees angles bent inwardly having adjoining distal ends forming a rectangle without interlocking tabs;

said filter frame longitudinal strip of material including a first longitudinal end frame member and a second longitudinal end frame member connecting to an opposing first longitudinal side frame member and a second longitudinal side frame member;

said first longitudinal end frame member including three longitudinal spaced apart parallel score lines defining a first a first longitudinal side flange, a first longitudinal score line forming a first longitudinal side edge, a longitudinal center flange extending from said first longitudinal side edge including a longitudinal center score line, a second longitudinal score line forming a second longitudinal side edge connecting a second longitudinal flange to said longitudinal center flange;

said second longitudinal end member opposing said first longitudinal end frame member and including three longitudinal spaced apart parallel score lines defining a first a first longitudinal side flange, a first longitudinal score line forming a first longitudinal side edge, a longitudinal center flange extending from said first longitudinal side edge including a longitudinal center score line, a second longitudinal score line forming a second longitudinal side edge connecting a second longitudinal flange to said longitudinal center flange;

said first longitudinal side member opposing said first longitudinal end frame member and including three longitudinal spaced apart parallel score lines defining a first a first longitudinal side flange, a first longitudinal score line forming a first longitudinal side edge, a longitudinal center flange extending from said first longitudinal side edge including a longitudinal center score line, a second longitudinal score line forming a second longitudinal side edge connecting a second longitudinal flange to said longitudinal center flange whereby said first longitudinal side member connecting said first longitudinal end member and said second longitudinal end member;

said second longitudinal side member opposing said first longitudinal side frame member and including three longitudinal spaced apart parallel score lines defining a first a first longitudinal side flange, a first longitudinal score line forming a first longitudinal side edge, a longitudinal center flange extending from said first longitudinal side edge including a longitudinal center score line, a second longitudinal score line forming a second longitudinal side edge connecting a second longitudinal flange to said longitudinal center flange, whereby said second longitudinal side member connecting said first longitudinal end member and said second longitudinal end member; and said air filter frame and said pleated filter media providing a collapsed state in which said pleated filter media and said filter frame are in a compressed state wherein said longitudinal center score line of said first longitudinal end frame member and said opposing second longitudinal end frame member and said first longitudinal side frame member and said opposing second longitudinal side frame member is extendable outwardly forming an outward fold having an angle of less than 180 degrees when said air filter frame and said pleated filter media is in a compressed state and is expandable to rigid state upon application of inward pressure to said outward fold formed in said longitudinal center score line of said first longitudinal end frame member and said opposing second longitudinal end frame member and said first longitudinal side frame member and said opposing second longitudinal side frame member in which said filter frame and said pleated filter media are expanded to an in-use state.

3. The disposable and collapsible HVAC air filter frame and filter unit of claim 1, wherein said first longitudinal end frame member and said second longitudinal end frame member connecting to said opposing first longitudinal side frame member and said second longitudinal side frame member have distal ends connecting together overlapping with an adhesive forming an air tight seal with said filter media.

4. The disposable and collapsible HVAC air filter frame and filter unit of claim 2, wherein said first longitudinal end frame member and said second longitudinal end frame member connecting to said opposing first longitudinal side frame member and said second longitudinal side frame member have distal ends connecting together overlapping with an adhesive forming an air tight seal with said filter media.

* * * * *